INVENTOR.
Ralph W. Gruetzmacher
Glenn O. McClurg
Donald T. O'Connor

BY
ATTORNEYS

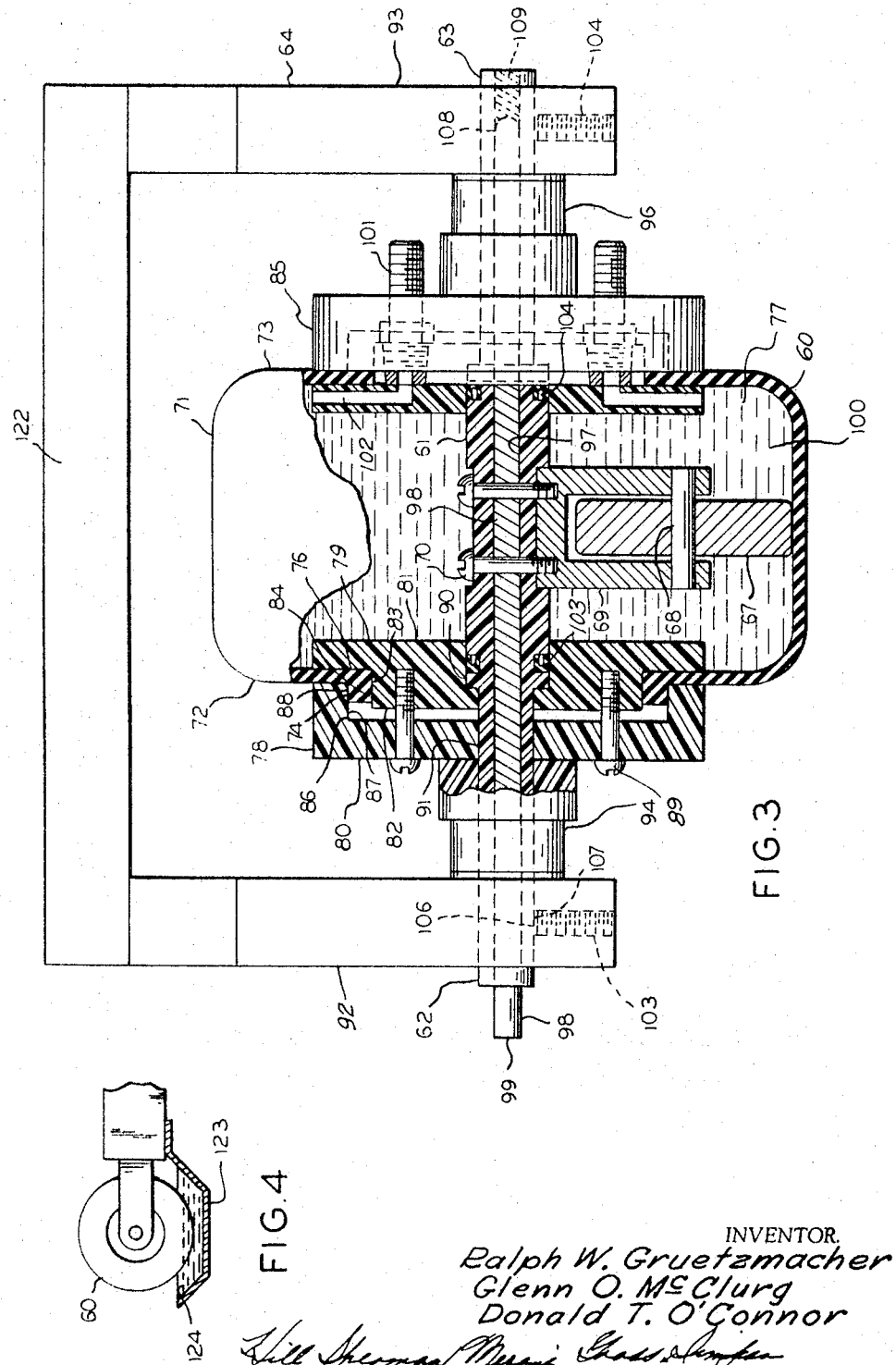

United States Patent Office 3,465,242
Patented Sept. 2, 1969

3,465,242
APPARATUS FOR NON-DESTRUCTIVE TESTING OF A DIELECTRIC MATERIAL INCLUDING RESILIENT DIELECTRIC COUPLING MEANS POSITIONED BETWEEN AN ELECTRODE AND THE MATERIAL UNDER TEST
Ralph W. Gruetzmacher, River Grove, Glenn O. McClurg, Evanston, and Donald T. O'Connor, Barrington, Ill., assignors to Magnaflux Corporation, Chicago, Ill., a corporation of Delaware
Filed Jan. 17, 1964, Ser. No. 338,430
Int. Cl. G01r 31/12
U.S. Cl. 324—54    22 Claims This invention relates generally to non-destructive test apparatus and more particularly relates to a new and improved system for applying a corona test to dielectric materials for determining the location of voids which may exist within the material.

Corona testing is used for determining the location of voids within dielectric material such as glass fiber composites and consists of applying a high voltage across a pair of electrodes situated on opposite sides of the dielectric material whereby a corona discharge will occur in gaps or voids in the material due to the ionization of gases therein. Such corona discharges produce high frequency fluctuations in the current flow through the electrodes, which can be detected by suitable apparatus to indicate the existence of the void or gap. Corona discharge also produces radio frequency radiation which can be detected, for example, by means of a radio receiver.

In using the corona test method, it is necessary to avoid any air spaces or gaps between the electrodes and the surfaces of the dielectric material adjacent the electrodes. For this reason the application of a corona test has generally required immersion of the dielectric material to be tested in a bath of suitable dielectric liquid to preclude the existence of gases around the test material, and has also generally required the use of non-movable electrodes situated within the liquid bath.

As a result, the utilization of the corona test method has been time consuming, laborious and costly. Generally the liquid dielectric bath used is oil, and cleaning of the test material presents another costly and time consuming step. In addition, the immobility of the electrodes in such an arrangement often makes a corona test extremely difficult.

Another problem frequently confronted in testing by the corona method arises when the dielectric material to be tested is round or cylindrically shaped. For example, in corona testing of dielectric material in the form of an elongated cylinder or shell the problems presented in positioning one of the electrodes adjacent the inside surface of the wall of the cylinder and then scanning the entire cylinder wall while maintaining the second electrode in juxtaposition adjacent the outside surface of the cylinder wall have not been heretofore satisfactorily solved.

In accordance with the principles of the present invention the problems mentioned hereinabove are greatly reduced or entirely eliminated. The dielectric material to be tested need not be immersed in an oil bath, but can instead be situated in open air space. At the same time corona discharges outside the dielectric material are precluded. Configurations of test materials heretofore not readily adapted to corona testing, such as elongated cylinders, can be easily tested for voids or gaps within the material and by means of a special mechanism the electrodes can be moved relative to the test material to greatly reduce the time required for testing and to simplify the testing and test recording procedures.

It is, therefore, an object of the present invention to provide a corona test system whereby the dielectric test material can be situated in an open air space and need not be immersed in a dielectric liquid bath.

It is another object of the present invention to eliminate corona discharges between the electrodes and the adjacent surfaces of the test material when the material is being tested in an atmosphere of air or other gases.

Another object of the present invention is to provide a corona test system whereby the test material need not be cleaned after testing due to immersion in a liquid bath.

Yet another object of the present invention resides in the provision of corona test systems capable of easily testing material shaped in forms heretofore considered difficult to test.

Another object of the present invention is to provide a test arrangement whereby the electrodes are moved through a controlled path relative to the test material whereby the material is continuously scanned by the electrodes and the time required for testing is substantially reduced.

Another object of the present invention is to provide a corona test system which is comprised of easily constructed and relatively inexpensive components, reliable in operation and adapted to provide years of useful service with a minimum of maintenance.

Many other features, advantages and additional objects of the present invention will become manifest to those versed in the art upon making reference to the detailed description which follows and the accompanying sheets of drawings, in which a preferred structural embodiment incorporating the principles of the present invention is shown by way of illustrative example only.

ON THE DRAWINGS

FIGURE 3 is a front elevational view of a new and novel scanning wheel of the present invention with portions cut away and other portions in section for clarity; and FIGURE 4 is a scanning wheel liquid applicator of the present invention.

AS SHOWN IN THE DRAWINGS

Figure 1:
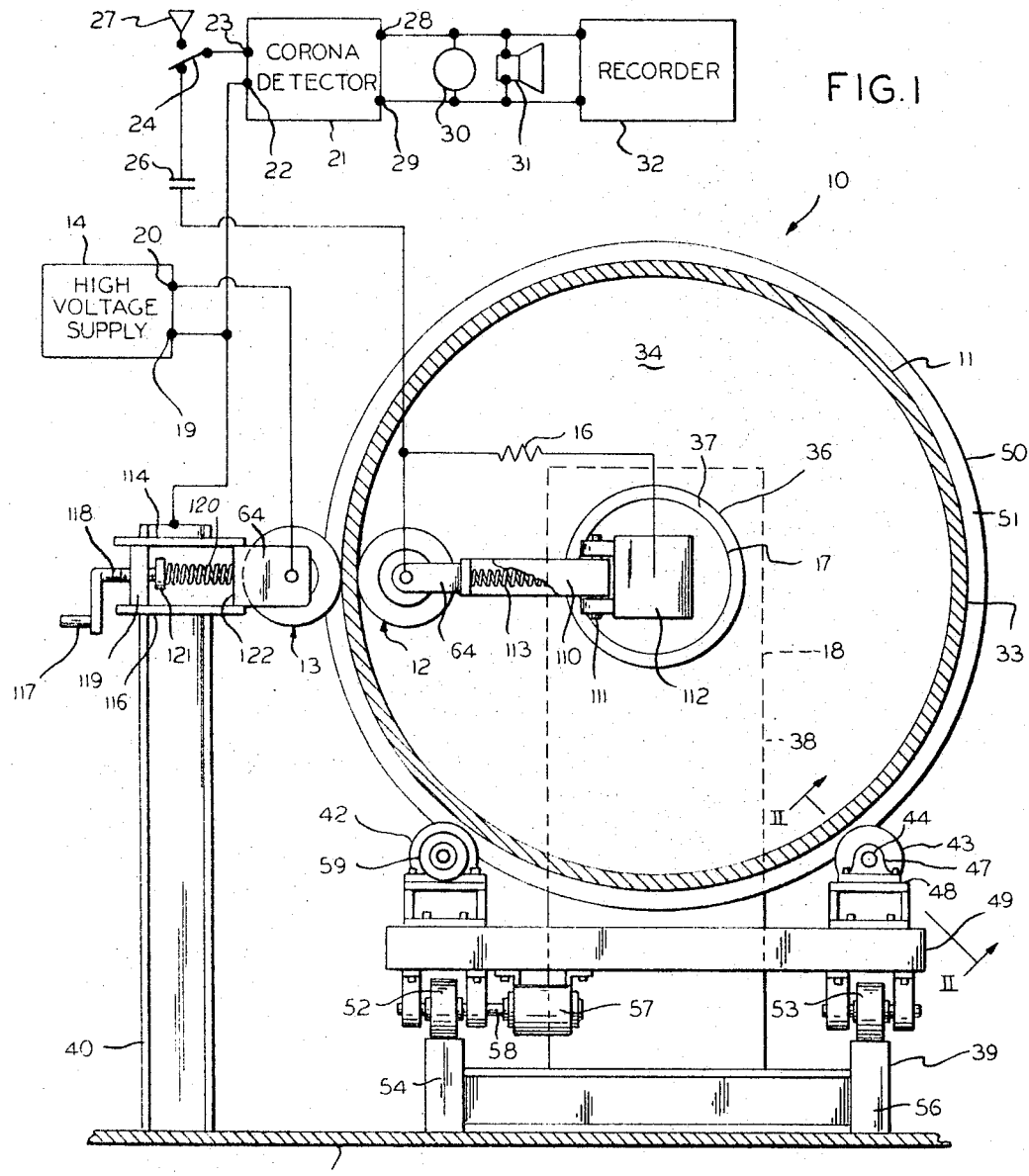
FIGURE 1 is a somewhat diagrammatic view of a corona test system constructed in accordance with the principles of the present invention.

In FIGURE 1 reference numeral 10 generally designates a corona test system constructed according to this invention and particularly designed for the testing of an elongated cylindrical shell such as a missile case 11 of dielectric material such as filament wound glass-epoxy, it being understood that various features of the invention have other applications.

In general, the system 10 comprises a pair of electrode assemblies 12 and 13 located respectively inside and outside of the case 11 and connected to a high voltage supply 14. As diagrammatically illustrated, the inside assembly 12 is connected through a resistor 16 to an elongated metal support arm 17 of the system which is, in turn, fixedly mounted on a metal main frame 18 which forms an electrical ground connected to one terminal 19 of the high voltage supply 14. The outside assembly 13 is insulated from the main frame and is connected to a second terminal 20 of the supply 14.

With a high voltage applied between the electrode assemblies 12 and 13, corona discharges will be produced by voids or other such defects or gaps in the case 11, to cause changes in the current through resistor 16 having high frequency components. Such high frequency components are detected by a corona detector 21 having one input terminal 22 connected to ground, i.e., the main frame of the system, and a second input terminal 23 connected through a selector switch 24 and through a coupling capacitor 26 to the inside electrode assembly 12.

The corona discharges also produce radio frequency radiations and in the alternative, the input terminal 23 may be connected through the selector switch 24 to an antenna 27. Corona detector 21 is preferably in the form of a standard AM short wave radio receiver tuned to 3 mc., for example, and has a pair of output terminals 28 and 29 connected to a meter 30, a speaker 31 and a recorder 32. The detector 21 may be physically located within the case 11 on the support arm 17 for the inside electrode assembly 12.

As illustrated, the casing 11 has a circular cross-section and the exemplary embodiment comprises an elongated cylindrically shaped wall 33 which projects axially outwardly of the drawing as viewed in FIGURE 1. The wall 33 constitutes a filament wound glass-epoxy dielectric material to provide substantial strength-to-weight ratio, and other dielectric material, such as plastic sheet and a rubber liner may advantageously be wrapped about the inner surface of the missile case 11 and bonded or otherwise fixedly secured to the wall 33.

One end of the case 11 is closed by a semi-spherical end wall 34 centrally apertured as at 36 to provide an opening 37 into the interior of the missile case. The opposite end of the case may be closed by an end wall (not shown) which may be formed with a plurality of smaller apertures for receiving the various exhaust pipes of the missile.

The metal main frame 18 comprises a vertically upstanding upright 38, a rail frame 39 and a support member 40 resting upon a metal base plate 41 to provide for a continuous electrical ground throughout the entire frame of the system. Connected in fixed assembly to and projecting axially outwardly from the upright member 38, the support arm 17 is adapted to extend or project through the opening 37 into the interior of the case 11.

One aspect of the present invention resides in the provision of means for providing relative movement between the electrodes and the dielectric material to be tested, and for this purpose the case 11 is supported for rotation about its axis by means of a plurality of circumferentially spaced rollers 42 and 43 situated below a horizontal axially extending plane which intersects the axis of the case 11 and situated on opposite sides of a vertical axially extending plane which intersects the case axis. Rollers 42 and 43 comprise a set, and it will be appreciated that two or more axially spaced sets may be provided, depending upon the length and weight of the case 11.

Figure 2:
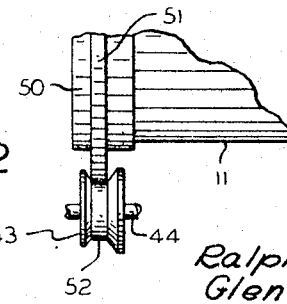
FIGURE 2 is a fragmentary elevational view of a guide and roller assembly of the present invention.

Rollers 42 and 43 are mounted for rotation on shaft member 44 journalled as at 47 to be fixedly secured by means of a journal support 48 to a carriage frame as at 49. As illustrated in FIGURES 1 and 2, a plurality of axially spaced circumferentially continuous heavy duty rims as at 50 may be wrapped around the outside surface of and fastened by suitable means to the wall 33 of the case 11.

Rims 50 may comprise a radially outwardly extending flange 51 forming a circumferential track means for engaging a groove 52 formed circumferentially about the rollers 42 and 43 for maintaining axial alignment between the roll members and the rims 50.

In order to provide translatory movement of the case 11, the carriage frame 49 is mounted on a plurality of wheels as at 52 and 53 which are adapted to rotatably ride on a pair of parallel spaced rails 54 and 56 connected to the frame 39.

In operation, the movement of the carriage frame 49 along the rails 54 and 56 may be in the order of only several feet per hour, and such movement may be imparted by any suitable means. For example, a winch and cable assembly (not shown) may be utilized or one or more electric motor-speed reducer units as at 57 may be directly connected to one or more wheel mounting shafts 58 for moving the case 11 slowly along the rails. Similarly, an electric motor unit 59 may be utilized for turning one or more of the rollers for rotating the case 11 about its axis.

Referring to FIGURE 3, the electrode assemblies 12 and 13 may be similarly constructed and comprise a tire member 60 made of resilient dielectric material such as rubber or neoprene rotatably mounted on a shaft 61 which is non-rotatably mounted at opposite ends thereof as at 62 and 63 on a generally U-shaped bracket flange 64. Housed within the tire 60 is an electrode roller 67 mounted for rotation on a shaft 68 situated parallel to the shaft 61 and mounted on a radially extending bifurcated member 69 connected in fixed assembly to the shaft 61 by suitable fastening means, for example, a plurality of threaded screws as at 70.

The tire 60 is more particularly characterized as comprising a cylindrical side wall 71 and a pair of radially extending spaced parallel end walls 72 and 73. An axially projecting circumferentially continuous flange portion 74 is formed on the inner portions 76 of the end walls 72 and 73.

In order to form a closed chamber 77 within the tire 60 a pair of caps as at 78 and 85 comprising an inner member 79 and an outer member 80 are securely mounted respectively on each of the end walls 72 and 73. The inner member 79 comprises an enlarged diameter body portion 81 and a reduced diameter portion 82 forming a shoulder surface 83 for receiving a complementarily shaped surface 84 of the flange 74.

The outer member 80 is centrally apertured as at 86 to form another shoulder surface 87 for receiving an outer surface 88 of the flange 74.

The inner and outer members 79 and 80 of the cap 78 are drawn together snugly to compress and engage the end walls of the tire by suitable fastening means such as a plurality of screws 89 and are also centrally apertured as at 90 and 91 respectively to receive the shaft 61. Mounted on the shaft 61 respectively between the caps 78 and 85 and adjacent bifurcate arm 92 and 93 of the bracket flange 64 are a pair of ball thrust bearings as at 94 and 96 to accommodate axial loading of the tire 60 on the shaft 61.

The electrode roller 67 is adapted to compress the side wall 71 of the tire 60 against an adjacent surface of the wall 33 of the case 11 and is of an electrically conductive material such as brass. The shaft 68, bifurcated member 69 and the threaded screws 70 also constitute electrically conductive material for a complete electrical connection therebetween. In order to electrically connect the roller 67 to the high voltage supply 14 (electrode assembly 13) or to the corona detector 21 (electrode assembly 12) the shaft 61 is centrally apertured as at 97 to receive an electrically conductive bar 98 which protrudes at one end thereof as at 99 from the shaft 61 to be connected by suitable electric circuit means to the high voltage supply of the corona detector.

The tires 60 of the electrode assemblies 12 and 13 are urged together by suitable means described hereinafter to form a nip therebetween for receiving the wall 33 of the case 11. It will be appreciated that as the tires are urged against the casing wall 33, the respective electrode rollers 67 will compress the side walls 71 of the tires 60 adjacent the nip-defining surfaces of the tires against the adjacent surfaces of the wall 33. The resilient tires 60 thereby abuttingly engage and form air-free couplings between the electrodes 67 and the adjacent surfaces of the wall 33.

In order to prevent spurious corona discharges between the electrode assemblies 12 and 13 at locations other than between the corresponding electrode rollers 67, the materials of construction of both of the electrode assemblies may comprise non-conductive dielectric material such as Bakelite or nylon with the exception of the electrode roller 67, the shaft 68, the member 69, screws 70 and the bar or rod 99. In addition, in order to prevent corona discharges within the tire 60, the chamber 77 formed thereby may be filled completely with a dielectric fluid such as silicone oil as shown at 100.

A pair of threaded valves as at 101 may be mounted on caps as at 85 for supplying the oil to the chamber 77 and may be connected thereto by means of a pair of passageways as at 102 formed in the corresponding inner member of the cap 85. A pair of oil seals as at 103 and 104 may be advantageously mounted on the shaft 61 as illustrated in order to confine the oil within the tire 60.

It will be appreciated that the tire axle or shaft 61 is non-rotatably mounted on the arms 92 and 93 and for this purpose a pair of threaded set screws 103 and 104 having flat inner faces as at 106 may be tightly threaded into the arms to engage complemental flat surfaces 107 of the end portions 62 and 63 of the shaft 61. In addition, in order to prevent spurious corona discharges from an end 108 of the bar 99, the end portion 63 of the shaft 61 may be plugged at 109 with a suitable dielectric material such as resin.

Referring again to FIGURE 1, in order to provide for insertion of the electrode assembly 12 through the opening 37, the bracket flange 64 is carried at the end of a swingable arm 110 which is pivotally mounted by means of a hinge as at 111 to a mounting plate 112 securely affixed to the distal end of the support arm 17. When the support arm 17 and the electrode assembly 12 are being inserted into the opening 37 of the case 11, the swingable arm 110 is pivoted to a position parallel to the arm 17, and after the assembly 12 and the arm 110 are positioned within the case 11, the arm 110 is then pivoted such that the electrode assembly 12 extends radially outwardly from the axis of the case 11 to align with electrode assembly 13 such that the axes of the tires of both of the assemblies are parallel to the axis of the case 11 and lie in a plane which extends coaxially with and intersects the axis of the case 11.

It will be appreciated that it is desirable to have both of the electrode assemblies 12 and 13 mutually biased in the direction of the nip formed therebetween for compressing the tires of the assembly snugly against the adjacent surfaces of the wall 33, and for this purpose the mounting bracket 64 of the assembly 12 is radially slidably carried on the swingable arm 110 and a radially outward bias may be imparted thereto by means of a coil spring 113. Similarly, the bracket flange 64 of the electrode assembly 13 may be slidably carried on a pair of mounting members 114 and 116 and may be radially adjustably positioned with respect to the casing wall 33 by any suitable means, for example, a hand crank 117 threaded as at 118 into a complementarily threaded bracket 119 for adjusting the tension of a coil spring 120 disposed between a spring receiving cap 121 of the hand crank 117 and a back plate 122 of the bracket flange 64.

In operation, a high voltage is continuously applied to the electrode assemblies 12 and 13 and the casing 11 may be slowly turned about its axis by means of the rollers 42 and 43 and may also be moved in a translatory direction along its axis by means of the carriage frame 49, such that the tires of the electrode assemblies 12 and 13 will be compressed against the adjacent surfaces of the wall 33 of the casing 11 and will scan the wall 33 in a helical path about the casing. Corona discharges which may occur in the wall 33 between the electrode assemblies 12 and 13 can then be detected on the meter 30 and the speaker 31 and can be recorded on the recorder 32. If desirable, the recorder can be of the pen type such that the rotative and translatory movement of the casing 11 can be made a function of the movement of the pen so as to permit ascertainment of the exact location in the wall 33 of voids or gaps which produce the corona discharges.

Depending upon the degree of roughness of the surfaces of the casing wall 33, it may be desirable to continuously wet the outer surfaces of the tires 60 of assemblies 12 and 13 with a liquid dielectric in order to ensure that no corona discharges occur between the outer surfaces of the tires and the adjacent surfaces of the casing wall 33. For that purpose and as illustrated in FIGURE 4 an open pan 123 containing a dielectric fluid 124 may be situated with respect to tire 60 such that as the tire rotates the lower portion thereof dips into the dielectric fluid in the pan to cover the outer surface thereof. It will be understood that other suitable means can be employed for wetting the tire, such as, for example, a wetted wick continuously engaging the outer surface of the tire.

In some applications, one surface of the material to be tested may have bonded thereto an electrically conductive sleeve or liner, and of course in such circumstances only a single electrode assembly of the present invention need be utilized, disposed adjacent the opposite surface of the dielectric test material which does not have the conductive liner bonded thereto.

Although minor modifications might be suggested by those versed in the art, it should be understood that we wish to embody within the scope of the patent warranted hereon all such modifications as reasonably come within the scope of our contribution to the art.

We claim as our invention:

1. In a system for corona testing of a dielectric material,
   a pair of electrodes adapted for disposition on opposite sides of the material under test,
   means for applying a high voltage between said electrodes,
   means for detecting corona discharges occurring in the electrostatic field between said electrodes, and
   coupling means adapted to be disposed between at least one of said electrodes and adjacent surface of the dielectric material under test for avoiding the production of corona discharges outside the dielectric material under test,
      said coupling means comprising a rotatable tire of resilient dielectric material surrounding said one electrode and adapted to be compressed between said one electrode and the adjacent surface of the dielectric material under test to allow relative movement of the electrode and the dielectric material and means for rotatably mounting said tire.

2. In a system for corona testing of a dielectric material,
   a pair of electrodes adapted for disposition on opposite sides of the material under test,
   means for applying a high voltage between said electrodes,
   means for detecting corona discharges occurring in the electrostatic field between said electrodes, and
   coupling means adapted to be disposed between said electrodes and the adjacent surfaces of the dielectric material under test for avoiding the production of corona discharges outside the dielectric material under test,
      said coupling means comprising a pair of rotatable tires of resilient dielectric material surrounding said electrodes respectively and adapted to be compressed between said electrodes and the adjacent surfaces of the dielectric material under test to allow relative movement of the electrodes and the dielectric material under test and means for rotatably mounting said tires.

3. In a system for corona testing of a dielectric material,
   a pair of electrodes adapted for disposition on opposite sides of the material under test,
   means for applying a high voltage between said electrodes, means for detecting corona discharges occurring in the electrostatic field between said electrodes, and coupling means adapted to be disposed between said electrodes and the adajcent surfaces of the dielectric material under test for avoiding the production of corona discharges outside the dielectric material under test, said coupling means comprising a pair of tires of resilient dielectric material surrounding said electrodes respectively and rotatable respectively about spaced parallel axes and adapted to be compressed between said electrodes and the adjacent surfaces of the dielectric material under test to allow relative movement of the electrodes and the dielectric material under test and means for rotatably mounting said tires.

4. In a system for corona testing of a dielectric material, a pair of electrodes adapted for disposition on opposite sides of the material, means for applying a high voltage between said electrodes, means for detecting corona discharges occurring in the electrostatic field between said electrodes, coupling means between at least one of said electrodes and the adjacent surface of the material for avoiding the production of corona discharges between said coupling means and the adjacent surface of the material, said coupling means comprising a tire of resilient dielectric impervious material enveloping said electrode, and a dielectric fluid filling said tire for avoiding the production of corona discharges within said tire.

5. The system of claim 4 in which said coupling means is adapted to be compressed between said electrode and the adjacent surface of the dielectric material.

6. In a system for corona testing of a dielectric material, a pair of electrodes adapted for disposition on opposite sides of the material under test, means for applying a high voltage between said electrodes, means for detecting corona discharges occurring in the electrostatic field between said electrodes, coupling means adapted to be disposed between at least one of said electrodes and the adjacent surface of the dielectric material under test, said coupling means comprising a member of resilient dielectric material and means mounting said member adjacent said one electrode for compressing said member between said one electrode and the adjacent surface of the dielectric material under test, and means for wetting with a dielectric fluid said member on the surface thereof adjacent the dielectric material under test for avoiding the production of corona discharge between said member and the adjacent surface of the dielectric material under test.

7. In a system for corona testing of a dielectric material, a pair of tires adapted to be disposed on opposite sides of the dielectric material, each of said tires having a circularly shaped resilient dielectric side wall, mounting means for said tires, a pair of electrodes situated respectively within said tires and adapted to compress the side wall of said tires against adjacent surfaces of the dielectric material, means for applying a high voltage between said electrodes, and means for detecting corona discharges in the electrostatic field between said electrodes.

8. In a system for corona testing of a dielectric material, a pair of tires adapted to be disposed on opposite sides of the dielectric material, each of said tires having a circularly shaped resilient dielectric side wall, mounting means for said tires, said mounting means for at least one of tires being comprised of non-conductive material, a pair of electrodes situated respectively within said tires and adapted to compress the side wall of said tires against adjacent surfaces of the dielectric material, means for applying a high voltage between said electrodes, and means for detecting corona discharges in the electrostatic field between said electrodes.

9. In a system for corona testing of a dielectric material, a pair of resilient dielectric tires adapted to be disposed on opposite sides of the dielectric material, a pair of electrodes situated respectively within said tires and adapted to compress said tires against adjacent surfaces of the dielectric material, mounting means for rotatably mounting said tires on parallel axes for relative movement of the test material between said tires, means for applying a high voltage between said electrodes, and means for detecting corona discharge in the electrostatic field between said electrodes.

10. In a system for corona testing of a tubularly shaped test member of dielectric material, a pair of electrodes adapted to be situated in a plane extending axially of and intersecting the axis of the test member, said electrodes being adapted to be situated respectively on opposite sides of the test member, means for applying a high voltage between said electrodes, means for detecting corona discharges in the electrostatic field occurring between said electrodes, coupling means adapted to be disposed between at least one of said electrodes and the adjacent surface of the test member material for avoiding the production of corona discharges outside the test member, said coupling means comprising a layer of resilient dielectric material and means for mounting said layer adjacent said one electrode for compressing said layer between said one electrode and the adjacent surface of the test member, and means adapted for relatively moving the test member between said electrodes for scanning the test member.

11. The system of claim 10 in which said last named means provides for relative movement axially of the test member.

12. The system of claim 10 in which said last named means provides for relative movement circumferentially of the test member.

13. In a system for corona testing a test member having a tubularly shaped wall of dielectric material, a pair of substantially hollow annularly shaped tires comprising dielectric material, said tires being adapted to be situated respectively on opposite sides of the tubular wall to define a nip therebetween for receiving the tubular wall, mounting means including a pair of shaft means connected to said tires for rotatably mounting said tires on spaced axes generally parallel to the axis of the test member, a pair of electrodes situated respectively within said tires and supported by said mounting means, said electrodes being adapted to press the nip defining surfaces of said respective tires against adjacent surfaces of the tubular wall, means for applying a high voltage between said electrodes, and means for detecting corona discharges in the electrostatic field occurring between said electrodes.

14. In a system for corona testing a test member having a tubularly shaped wall of dielectric material, a pair of resilient substantially hollow annularly shaped tires comprising dielectric material, said tires being adapted to be situated respectively on opposite sides of the tubular wall to define a nip therebetween for receiving the tubular wall, mounting means including a pair of shaft means connected to said tires for rotatably mounting said tires on spaced axes generally parallel to the axis of the test member, a pair of electrodes situated respectively within said tires and supported by said mounting means, said mounting means for at least one of said tires constituting non-conductive material, said electrodes being adapted to extend in a plane extending axially of and intersecting the axis of the test member to press the nip-defining surfaces of said respective tires against adjacent surfaces of the tubular wall, means for applying a high voltage between said electrodes, and means for detecting corona discharges in the electrostatic field occurring between said electrodes.

15. In a system for corona testing a test member having a tubularly shaped wall of dielectric material, a pair of tires comprising dielectric material, said tires being adapted to be situated respectively on opposite sides of the tubular wall to define a nip therebetween for receiving the tubular wall, mounting means including a pair of shaft means connected to said tires for rotatably mounting said tires on spaced axes generally parallel to the axis of said member, a pair of electrodes situated respectively within said tires and supported by said mounting means, said electrodes being adapted to press the nip-defining surfaces of said respective tires against adjacent surfaces of the tubular wall, means for applying a high voltage between said electrodes, means for detecting corona discharges in the electrostatic field occurring between said electrodes, and means adapted to provide relative movement between the tubular wall and said electrodes to provide a scanning effect of said electrodes along the tubular wall.

16. In the system of claim 15 in which said last named means is adapted to provide relative circumferential movement between the tubular wall and said electrodes to provide a scanning effect of said electrodes along the circumference of the tubular wall.

17. In the system of claim 15 in which said last named means is adapted to provide relative axial movement between the tubular wall and said electrodes to provide a scanning effect of said electrodes axially along the tubular wall.

18. The system of claim 15 is which said last named means is adapted to provide relative circumferential and axial movement between the tubular wall and said electrodes to provide a scanning effect of said electrodes in a helical path about the tubular wall.

19. In a system for corona testing a test member having a tubularly shaped wall of dielectric material, a pair of cylindrically shaped closed impervious tires, said tires each being hollow and each having an outer wall of resilient dielectric material, said tires being adapted to be situated respectively on opposite sides of the tubular wall to define a nip therebetween for receiving the tubular wall, mounting means including a pair of shafts connected respectively to said tires for rotatably mounting said tires on spaced axes generally parallel to the axis of said member, at least one of said shafts being constituted of non-conductive material, a pair of electrodes situated respectively within and enclosed by said tires and connected respectively to said shafts, said electrodes extending in the direction of said nip, said electrodes each having a rotatable electrode roller mounted thereon at interfacing portions thereof to press the inside surfaces of the nip-defining portions of said tires against adjacent surfaces of the tubular wall, means extending into said tires and connected to said electrodes for applying a high voltage to said electrodes, means for detecting corona discharges occurring in the electrostatic field between said electrodes, a dielectric fluid within at least one of said tires for avoiding corona discharges therein, means for applying a dielectric fluid to the outer surface of at least one of said tires for avoiding corona discharges between said tire and adjacent surface of the tubular wall, and means for providing relative circumferential and axial movement of said tires along the tubular wall to relatively move said tires in a helical path around the tubular wall to provide a scanning effect on the tubular wall.

20. An electrode scanning wheel for a corona test system comprising, a resilient annularly shaped tire made of dielectric material, said tire being closed to form an impervious chamber therein, mounting means extending through said tire for rotatably mounting said tire, a radially extending electrode situated within said chamber and connected to said mounting means for pressing against the circumferential surface of the time.

said electrode being adapted for connecting to a high voltage supply source, and a dielectric fluid filling said chamber.

21. An electrode scanning wheel for a corona test system comprising, a first cylindrical shaft comprising a non-conductive material, a support member for mounting said shaft, a hollow closed impervious resilient tire comprising dielectric material, bearing means for rotatably mounting said tire on said first shaft, an electrode assembly fixedly mounted non-rotatably on said shaft and housed within said tire, said electrode assembly comprising a mounting member connected to said shaft, a roller member, and a second cylindrical shaft situated parallel to said first shaft and connected to the distal end of said mounting member for rotatably mounting said roller member on an axis parallel to the axis of said tire, said mounting member extending radially outwardly of said first shaft whereby said roller member presses radially outwardly against the inner surface of said tire, and electrical conductor means extending through said shaft and connected to said electrode assembly for supplying a high voltage to said electrode assembly.

22. An electrode scanning wheel for a corona test system comprising, a first cylindrical shaft comprising a non-conductive material, a support member for mounting said shaft, a hollow closed impervious resilient tire comprising dielectric material, bearing means for rotatably mounting said tire on said first shaft, an electrode assembly fixedly mounted non-rotatably on said shaft and housed within said tire, said electrode assembly comprising a mounting member connected to said shaft, a roller member, and a second cylindrical shaft situated parallel to said first shaft and connected to the distal end of said mounting member for rotatably mounting said roller member on an axis parallel to the axis of said tire, said mounting member extending radially outwardly of said first shaft whereby said roller member presses radially outwardly against the inner surface of said tire, a dielectric fluid filling said tire, and fluid seals on said first shaft for maintaining said fluid within said tire.

References Cited

UNITED STATES PATENTS

| | | | |
|---|---|---|---|
| 1,938,684 | 12/1933 | Bond et al. | 324—54 |
| 2,379,947 | 7/1945 | Bandur | 324—54 |
| 2,555,977 | 6/1951 | Kline | 324—61 |
| 2,704,825 | 3/1955 | Martin et al. | 324—54 |
| 2,809,349 | 10/1957 | Miller | 324—54 |
| 2,849,675 | 8/1958 | Hall et al. | 324—61 |
| 2,882,491 | 4/1959 | Gooding | 324—54 |
| 2,900,597 | 8/1959 | Gooding | 324—54 |
| 2,974,276 | 3/1961 | Davis | 324—9 XR |
| 2,993,168 | 7/1961 | Burnette | 324—61 |
| 3,043,993 | 7/1962 | Maltby | 324—61 XR |
| 3,069,620 | 12/1962 | Servos | 324—54 |
| 3,209,247 | 9/1965 | Mead et al. | 324—61 |
| 3,229,199 | 1/1966 | Mildner | 324—54 |

FOREIGN PATENTS

| | | |
|---|---|---|
| 917,893 | 2/1963 | Great Britain. |

RUDOLPH V. ROLINEC, Primary Examiner

G. R. STRECKER, Assistant Examiner